Dec. 4, 1945.  C. A. SPOTZ  2,390,337
METHOD AND MACHINE FOR MAKING CAPSULES PARTICULARLY GELATIN CAPSULES
Filed May 13, 1941  6 Sheets-Sheet 5

FIG.6.

INVENTOR,
CHESTER A. SPOTZ.
BY
ATTORNEYS.

Dec. 4, 1945.   C. A. SPOTZ   2,390,337
METHOD AND MACHINE FOR MAKING CAPSULES PARTICULARLY GELATIN CAPSULES
Filed May 13, 1941   6 Sheets-Sheet 6

INVENTOR,
CHESTER A. SPOTZ

Smart & Biggar
BY-
ATTORNEYS

Patented Dec. 4, 1945

2,390,337

UNITED STATES PATENT OFFICE 2,390,337

METHOD AND MACHINE FOR MAKING CAPSULES, PARTICULARLY GELATIN CAPSULES

Chester A. Spotz, Lachute, Quebec, Canada

Application May 13, 1941, Serial No. 393,222

23 Claims. (Cl. 18—19)

This invention relates to a method and machine for making capsules, particularly gelatin capsules.

Over a long period of years, the most widely followed method of making gelatin capsules was to cover the bottom of a multi-cavity female die with a sheet of gelatin and then pour the desired capsule filling liquid over the surface of the gelatin. Following this a second sheet of gelatin was placed over the upper surface of the liquid, and a multi-cavity male die having cavities corresponding with those in the female die was pressed downwardly over the upper sheet of gelatin so as to press the two sheets together and cut therefrom by way of the mating cavities a plurality of capsules, confining therein the capsule filling liquid and simultaneously sealing the capsules, these operations being carried on under suitable pressure and temperature conditions so as to achieve this result. This method is still followed to a considerable extent.

The disadvantages of this method are that it is comparatively slow, that it results in the loss of a great deal of the capsule filling material which is trapped between those portions of the gelatin sheets that are left (i. e., a foraminous mat) after the capsules are formed, and that it consequently also results in a loss of gelatin. In some cases the surplus gelatin may be used again after it has been freed from the capsule filling material trapped in it, but in many cases the capsule filling material is such that the surplus gelatin cannot be readily freed from it so that there is a loss of both the gelatin and the capsule filling material. In a large number of instances the capsule filling material is very expensive, particularly in the case of certain medical compounds, so that the resultant cost of the capsules must be relatively high and the profit comparatively low.

Attempts were made to produce an automatic capsule making machine and in the past few years an automatic capsule machine has been developed and put into commercial use. This has involved the formation of gelatin strips, two of which are fed by suitable conveying means over the surface of a member designed to supply liquid content material for the capsule ultimately formed and thence to a pair of cooperating rotary dies. The strips are passed over and held against similar opposing surfaces prior to contacting with the dies, and the capsule filling material is forced against one or both strips just before they are moved into contact with one another between the dies and at a point when a corresponding cavity of each die is disposed against each strip, so that the resultant pressure of liquid bulges out each strip into the cavity over which it lies. When these cavities are brought together with the strips the capsule is cut and sealed with the filling material trapped therein.

While this machine has operated successfully to produce capsules it has several disadvantages. It is difficult to prevent air from passing along with the filling material into the capsule, particularly where there may be small depressions in the strip which are not eliminated by contact with the surface over which the strip passes, and air has the result in a majority of cases of causing deterioration of the contents of the capsule. A further disadvantage is that it is impossible to obtain a truly symmetrical and consequently uniform capsule for the reason that the two strips of gelatin may not always have the same elastic properties by reason either of one strip being of greater thickness than the other or of a difference in temperature of the two strips. In such a case the pressure of the capsule filling material which is discharged from orifices against one or both strips will cause the least resistant strip to receive a greater portion of the filling material, thus bulging it to a greater extent than the opposite strip with the result that a lopsided capsule is formed and sealed in that condition. Another disadvantage of this machine is that if either one of the strips of gelatin at any point in its length is thinner than it should be and does not contact with the die after it is moved to the capsule filling point, the pressure of the filling liquid can be exerted sideways during the time that it is forcing the gelatin outwardly from the surface over which it is travelling and into the die, thus leaving a space between the strip and such surface. Any leakage of the filling material onto the die or dies is a serious disadvantage as it contaminates not only the dies but the capsules which are filled after they have been contaminated. The machine should be shut down and thoroughly cleaned and any contaminated capsules may have to be subjected to a relatively expensive treatment to make them saleable.

I have devised a method and machine for making capsules which avoids the disadvantages of the two prior methods. By the utilization of my invention capsules may be speedily and efficiently made with negligible loss of the capsule filling material during the formation of the capsule. The possibility of seepage of air into the capsule is eliminated and a satisfactorily uniform capsule can be obtained. I accomplish this by first forming gelatin strips into a tube and then making the capsule from such tube.

Figure 1:
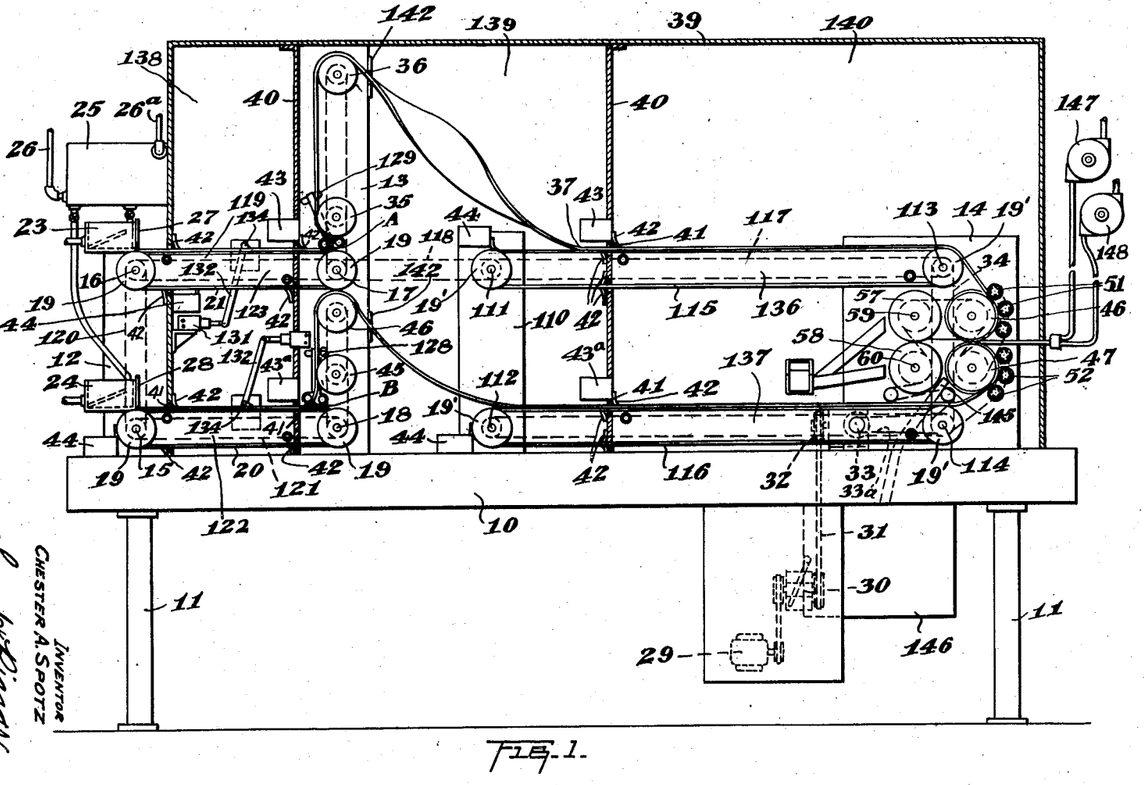
Fig. 1 is a side elevation of a capsule making machine according to the present invention with the casing shown in section.

The method can be followed out in a machine such as illustrated in the accompanying drawings. Referring first to Figure 1, the machine includes a base 10 suitably supported as at 11 with suitable superstructure rising from the base to support the various working elements. This superstructure may include channel irons or other suitable supports 12, 13 and 110 and a metal plate structure 14 at the opposite end of the base 10. On the channel irons 12 the shafts 15 and 16 may be suitably journalled with corresponding shafts 17 and 18 journalled on channel irons 13.

These shafts carry pulleys 19 over which run the endless belts 20 and 21.

On the channel irons 110 shafts 111 and 112 are journalled with corresponding shafts 113 and 114 journalled on the plate structure 14. On these shafts 111, 112, 113 and 114 are mounted pulleys 19' which carry the endless belts 115 and 116.

The construction is such that the machine may readily be built to carry multiple units and to duplicate various parts of the apparatus. This will be readily appreciated by reference to Figure 2, where it will be seen that the belts and pulleys are duplicated so as to provide a machine having two units for making capsules simultaneously.

On the channel irons 12 suitable supports are formed such as angle irons or plates 22 (Fig. 2), on which are supported the gelatin tanks 23 and 24, each of which may be fed from a main tank 25 through suitable pipe lines as shown. Tanks 23 and 24 may be provided with float valves to control the supply of gelatin as required from tank 25, which latter is heated, as for instance by a hot water or steam jacket, the circulation for the heating medium being controlled by the pipes 26 and 26ª. The tanks 23 and 24 may alternatively be provided with an overflow dam as shown in Figure 1, so that when the liquid gelatin reaches a predetermined head it will overflow. The overflow may be collected in a suitable receptacle and used again. The effect of the overflow dam is to secure a uniform pressure of the gelatin under the doctor blades 27 and 28 which are associated with the tanks, and thus to secure a uniform thickness of the film of gelatin deposited on the endless belts 20 and 21, adjacent to which the tanks 23 and 24 are disposed, as shown in Figure 1. The doctor blades may be provided with a micrometer adjustment to secure an accurate film thickness.

The drive for the belts may be effected by a suitable electric motor 29 through a clutch control 30, which drives a pulley 32 by means of a belt 31. The drive pulley 32 operates a suitable reduction unit, the sprocket 33 of which is connected by a chain 33ª with a sprocket driving the shaft 114. The shaft 113 is driven simultaneously with and at the same speed as the shaft 114 by means of a chain 34 which operates a sprocket keyed on shaft 113. Shafts 111, 17, 16, 15 and 18 are driven by the motor through a suitable series of belt or chains 34, 117, 118, 119, 120 and 121, and shaft 112 is shown as driven by a chain and sprocket from the shaft 114. The take-off rolls 35 and 36 are driven by chain and sprocket attached to the shaft 17. The take-off rolls 45 and 46 are driven in a similar manner from the shaft 18.

The driving assembly, of course, may be any suitable assembly; while I have shown a chain drive, a geared drive would be equally good, and similarly hereafter where a chain drive is referred to it is to be understood that a geared drive may be substituted where practicable without changing the essence of my invention.

The belts 20, 21, 115 and 116 may be formed of stainless steel and are designed to carry the film of gelatin deposited thereon by the tanks 23 and 24 to the forming dies where it is formed into tubes.

The gelatin is heated in the tank 25 to a temperature sufficiently high to get it in a viscous state. It is then deposited on the belts 20 and 21 where it is cooled by suitable cooling means to a temperature such that it can be carried over the take-off rolls as described herein later. It is reheated at the capsule-making end of the machine to a temperature high enough to provide for proper sealing of the capsule. The temperature may vary with different batches of gelatin, depending upon the moisture content of the gelatin and its ability to cure quickly, but could be easily determined by a skilled operator.

The film of gelatin on the belt 21 after it has been hardened to some extent by cooling is carried over the rollers 35 and 36, which lengthens its path of travel and allows for further hardening. It is then taken to the belt 115, as illustrated in Figure 1, at the point 37, a support 142 being provided for it after it leaves the roller 36 to help carry it. Between roller 36 and the point 37, the strip is twisted as at 38 so that the side initially uppermost is turned in to lie on the belt 115. This is done because the uppermost side of the gelatin strip is smoother than that disposed against the belt when the strip is formed initially. Thus by turning the smooth side into contact with the belt 115 at point 37 the smooth side will ultimately become a part of the outside of the capsules to be formed. The gelatin film on the belt 20 is similarly carried over rolls 45 and 46 and is then carried down to the belt 116. This strip, however, is not twisted as the smooth side will be outermost after it passes through the forming rolls later described.

When the gelatin strips pass over the rolls 35 and 36 and over the rolls 45 and 46 there is a certain amount of stretch in them. The amount of stretch varies with different batches of gelatin. Means to take up the stretch must be provided, because otherwise the strips would pile up at points A and B since the speed of the movement of the belts is synchronized. It is not possible to adjust the speed of the belts 20 and 21 with relation to the speed of the belts 116 and 115 to allow for the stretch because of the fact that the amount of stretch varies with different batches of gelatin. One means of taking up the stretch is to use mercury switches having trip arms thereon which operate through solenoids to stop the belts 20 and 21 until the strips have been carried along their path of travel on the belts 115 and 116 over the rolls 35, 36, and 45, 46, a sufficient distance to take up the stretch, after which the switches operate to start the belts 20 and 21 again.

Figure 12:
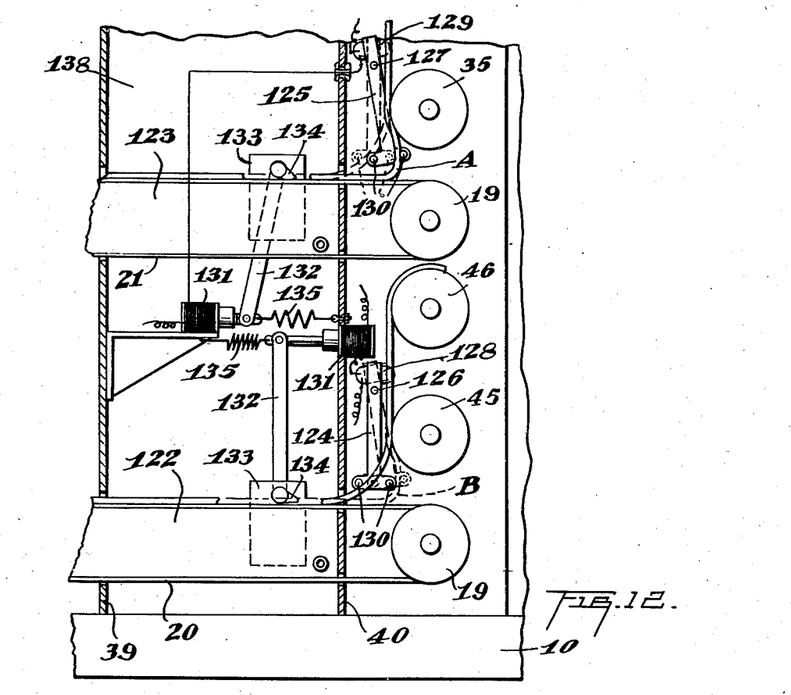
Fig. 12 is an enlarged fragmentary detail of means to control the first series of endless belts to take up the stretch in the gelatin strips.
Figure 13:
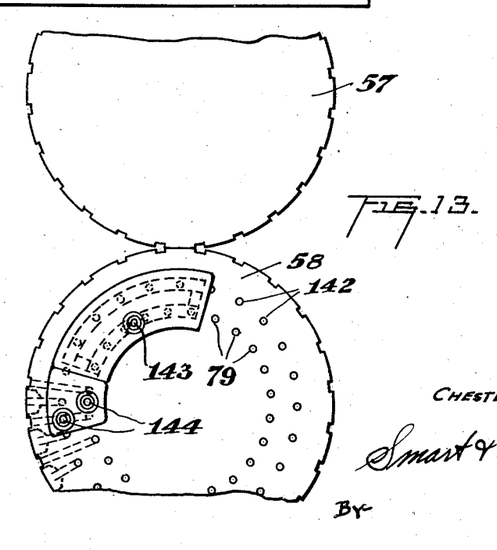
Fig. 13 is a modified form of fittings designed to slidably engage the side face of the capsule dies. One of the fittings subjects the capsule cavities to air pressure while the other causes the waste cavities to be subjected to suction or vacuum.

Figure 12 illustrates such means. Pivotally mounted as at 126 and 127 are lever arms 124 and 125 which have mercury switches 128 and 129 mounted on their upper ends and are T-shaped at their lower ends to provide arms on which are mounted rollers 130 or simple smooth bars. The gelatin strip is passed between these rollers 130, and when it tends to pile up at, for example, A it will cause the lever arm 125 to swing, thereby closing the switch 129. A solenoid 131 in the circuit of the switch is thereby energized and attracts its armature which is pivotally attached to one end of a lever 132 carrying at its opposite end a stub shaft journalled in a plate 133 which is rigidly secured to a cooling member 123 to be hereafter described. The free end of the stub shaft is formed with an elliptical cam head 134, and movement of the lever 132 causes the belt 21 to be gripped between this cam and the cooling member 123, and thus causes it to slip on its pulleys. Alternatively, any suitable clutch means operated by the solenoid could be employed. When the belt 116, which is still in motion, carries away the undesired excess at A, the movement of the gelatin will carry the lever arm 125 to the position in which the lever 124 is illustrated, thereby causing the mercury switch to open and interrupt the flow of current to the solenoid. The spring 135 will then cause the lever arm 132 to return to its inoperative position and allow the belt 21 to resume its travel.

While I have shown a means for taking up the stretch of the gelatin strip at a particular point along its path of travel, those means could be applied adjacent to the forming rolls if desired.

Any suitable means may be used to control the temperature of the gelatin strips. In the drawings I have shown a water cooler 122 under the belt 20 and another cooler 123 under the belt 21. A continuous flow of water is maintained through these coolers, thus to some extent hardening the gelatin strips on the belts. Under each of the belts 115 and 116 I have also shown water heaters 136 and 137. Water at the proper temperature is kept flowing through these heaters to bring up the temperature of the gelatin strips to that required for proper sealing.

Another method of controlling the temperature of the gelatin strips is to provide a suitable casing, indicated by the numeral 39, divided into a plurality of chambers by means of partitions 40, in each of which chambers the temperatures may be controlled. For instance, in the chamber 138 the temperature would be maintained at the proper level to get the gelatin strip in a viscous state. In the chamber 139 the temperature could be atmospheric and in the chamber 140 the temperature would be maintained at the proper level to obtain a good sealing of the capsules. The strips are passed from chamber to chamber through slots or the like 41 formed in the walls of the partitions. Suitable sealing members 42 are disposed to close the slots and thus close off the chambers from one another. The sealing members 42 are, of course, flexible in character and disposed in wiping contact with the gelatin strips passing through the machine.

I have shown two alternative methods of controlling the temperature but the use of one is sufficient for the required control. The showing of the two methods in the drawings is for the purpose of illustration only. By the use of either method the required temperatures at various stages of the travel of the strips can be maintained.

During the passage of the strips through the machine they are suitably lubricated so that they may readily be removed from the belts and other parts with which they come in contact. This may be effected by employing suitable lubricant holders. In the drawings I have shown lubricating means 44 in wiping contact with the outside of each of belts 20 and 21 and each of belts 115 and 116. Lubricating members 43 and 43a are shown associated with the flexible sealing members 42, which may be wicks which will carry the lubricant. Each side of the gelatin strip must be lubricated so that it will not adhere to any of the rolls over which it passes or to the belt when it is taken off to be fed to the various rolls.

When the strips of gelatin have reached the end of their path of travel on the belts 115 and 116 they are passed to rotary tube forming dies 46 and 47 which are disposed in opposed relation to one another and cooperate to act on both strips simultaneously to join and form them into a tube, as will be explained hereinafter.

Figures 2, 7, 8, 9:
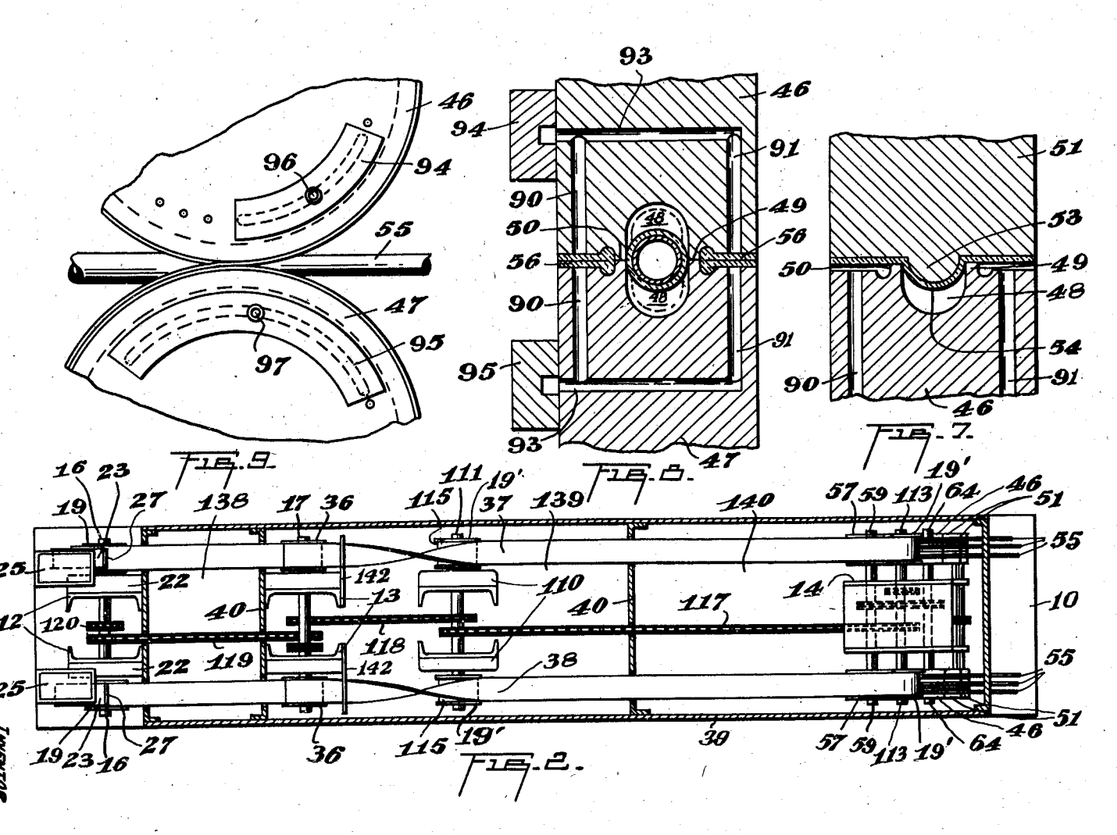
Fig. 2 is a top plan view of Fig. 1 with the casing also shown in section.
Fig. 7 is an enlarged fragmentary section taken through one of the tube forming rolls and abutting guide roll for shaping the material prior to forming the tube.
Fig. 8 is an enlarged fragmentary section taken through the two tube forming rolls at their nip, illustrating the manner in which a tube is formed around the mandrel or hollow sheath.
Fig. 9 is an enlarged fragmentary elevation of the two tube forming rolls, showing the mandrel or hollow sheath passing therebetween with part of the tube shown formed around the hollow sheath.

Each rotary tube forming die is provided with a central circumferential channel 48, as shown in Figures 7 and 8, the outer edges of which are defined by circumferential flanges 49 and 50 which project beyond the periphery of the die and together with the channel 48 constitute the forming die of the rolls.

When the gelatin strips are passed to the rotary tube forming dies 46 and 47 they pass over the periphery of these dies and between cooperating forming rolls, one series 51 being associated with the rotary die 46 and the second series 52 associated with the forming die 47. Each of these rolls is formed with a circumferential rib 53 having a rounded external contour and fitting within the channel 48 of the associated forming die, so that a portion of each strip of gelatin is formed into a semi-circle in cross-section, as illustrated at 54, to form one-half of the tube which is to be produced. It is apparent, therefore, that as the strips pass through their first portion of travel over dies 46 and 47 they are preliminarily formed into channel-like members. Any suitable alternative method of pre-forming the tube may of course be used.

In moving further around the dies 46 and 47 the strips pass through the nip of the latter to form the tube. This operation is carried out in combination with a hollow forming mandrel or the like 55 of an external depth corresponding to the interior diameter of the tube to be formed and consequently of a depth less than the width of the channels 48 in the forming rolls. The mandrel may be flattened along two sides, as will be more fully explained hereinafter.

As the strips of gelatin are moved into the nip of the forming dies the circumferential flanges 49 and 50 on each roll coming together have a shearing effect on the strips and the marginal portions 56 of the latter (see Fig. 8) are cut away while the parts of each strip designed to form the body of the tube are sealed together along the side edges. During the shearing and sealing operation the gelatin strips are formed around the mandrel so that when the tube is formed its interior diameter corresponds with the depth or greatest width, whichever is the greater, of the mandrel. In this way, therefore, it is possible to produce a tube having a uniform interior diameter throughout.

The marginal portions of the strips sheared during die formation of the tube are, of course, retrievable and readily melted to be used again. They are led off by suitable guides 145 and collected in receptacles 146 from which they may be taken to the tank to be used again, thus avoiding waste.

As the tube is formed it is advanced along the hollow forming mandrel to the rotary capsule forming dies 57 and 58 where it is formed into capsules which are filled with the desired material during the course of their formation. This may be accomplished in different ways which will be fully described hereinafter.

The rotary forming dies 57 and 58 are mounted on cross shafts 59 and 60 and are driven in timed relation to the tube forming dies 46 and 47 by means of sprockets which initially derive their motion from the shaft 114 carrying a suitable sprocket designed to operate the drive chain 61. This chain after passing around the sprocket on shaft 114 passes over a pair of idler sprockets 62 and 63, over a sprocket on shaft 60 and a sprocket on shaft 59 in such a way that the shafts 59 and 60 and consequently the rotary dies 57 and 58 are driven in opposite directions. The chain similarly passes on to a sprocket on shaft 64 and then to sprocket on shaft 65, which shafts carry the rotary dies 46 and 47, the chain engaging opposite sides of the sprockets so as to rotate the shafts 64 and 65 and dies 46 and 47 in opposite directions. The chain then passes on to engage a sprocket on shaft 66 which serves to cause rotation of the lower roll of the series 52, the remaining rolls of this series being driven from the lower roll by means of sprockets and chains. Thus the rotary tube forming die 46 and rotary capsule forming die 57 are rotated in the same direction, and the rotary tube forming die 47 and rotary capsule forming die 58 in the same direction but opposite to the direction of dies 46 and 57. The lower series of forming rolls 52 are operated through the same driving medium, while the upper series 51 are driven by means of a sprocket chain 141 from a sprocket on the shaft 65, the lower roll of the series 51 being driven from chain 141 and the remaining in the series driven from the lower roll by means of suitable sprockets and chains. Thus the series 51 are rotated in direction opposite to that of series 52, while each series 51, 52 is driven in opposite direction to the tube forming roll 46, 47 with which it cooperates.

The gelatin strips are moved through the machine by the gripping action of the capsule forming dies 57 and 58 which have the effect of pulling the formed tube and consequently the strips from which the tube is formed. In this connection it may be noted that the hollow mandrel 55 is reduced in diameter or depth as at 67 at a point between the tube forming rolls 46 and 47 and the capsule forming rolls 57 and 58. This will be noted by reference particularly to Figures 3 and 4. Thus excessive friction between the formed tube and the mandrel 55 is obviated. The sides of the inner end of the mandrel are flattened to permit of the escape of air from the tube and thus prevent air being sealed in the completed capsule.

Figures 4, 5, 10, 11:
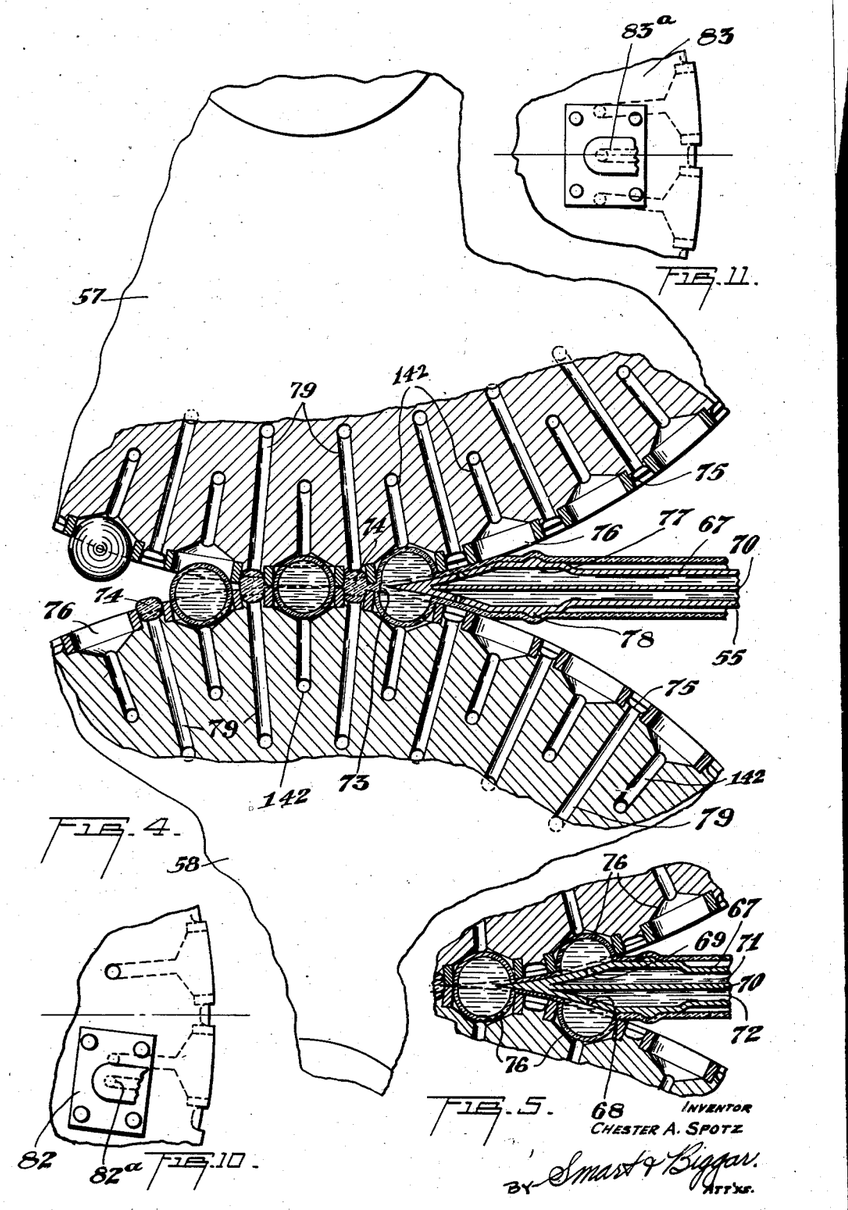
Fig. 4 is an enlarged fragmentary detail of the two rotary capsule forming die rolls, the rolls being partly broken away in section to illustrate the die cavities and the manner in which the capsules are formed therein, as well as to illustrate the construction of the hollow sheath around which the tube is formed and through which the capsules are filled.
Fig. 5 is an enlarged fragmentary detail of the rotary capsule forming die rolls, illustrating a capsule being filled from the hollow sheath in the step which is followed just prior to the forming of the capsule as illustrated at the end of the hollow sheath in Fig. 4.
Fig. 10 is an enlarged fragmentary detail of a fitting designed slidably to engage the side of the lower capsule forming die roll for subjecting the die cavities to air pressure at a predetermined point.
Fig. 11 is a similar view to Fig. 10 but illustrating similar fitting as applied to the upper capsule forming die roll.

The preferred manner of forming the capsules from the already formed tube is illustrated particularly in Figures 4 and 5. The inner end of the hollow mandrel is in effect swaged and terminates in a wedge-like formation, the outer relatively flattened surfaces of the wedge-like formation having an arcuate contour. The end of the mandrel 55 fits closely to the forming dies and extends to a point just short of the actual nip of these coacting rolls 57 and 58. As the tube is drawn over the swaged end of the mandrel 55 it is, of course, stretched and flattened out and the periphery of the die cavities 76 may be moved firmly into contact with the opposite sides of the tube as they lie on the swaged end of the mandrel 55. Having regard to the thickness of the gelatin tube and the very slight clearance between the peripheries of the die cavities 76 when passing the swaged end of the mandrel, these peripheries will be caused to engage the slightly flattened tube under pressure. In view of this the area of the tube enclosed by each die cavity will in effect be sealed between the die cavity and the mandrel 55 as illustrated in Figure 5.

The top and bottom sides of the swaged end of the mandrel are provided with orifices 68 and 69, at points to coincide with the centres of the die cavities of the dies 57 and 58 when a pair of these cavities are, as shown in Figure 5, pressing the gelatin tube against the swaged end of the mandrel. Thus filling material may be passed through the hollow mandrel and forced through the orifices 68 and 69 to bulge out the capsule forming tube into the opposed die cavities, as shown in Figure 5, partially to form the capsule.

In order to assure, however, that the opposite halves of each capsule are uniform I prefer to feed the filling material under pressure separately to each side of the capsule forming tube. This is accomplished by dividing the hollow mandrel 55 by a central division wall 70 and connecting the separated sections 71 and 72 with separate sources of supply of the filling material. By intermittently feeding under pressure measured and corresponding quantities of material through the sections 71 and 72 when each pair of die cavities 76 engages the opposite outer portions of the gelatin tube, the opposite inner portions of the tube will be bulged out on each side, as shown in Figure 5, to a uniform degree. If the filling material is injected through the hollow mandrel to form the capsule without separate control for each side, it is possible that the capsules formed may be non-uniform in character because the gelatin strips from which the tube is formed may have different degrees of elasticity, depending for instance upon their relative thickness and temperature, so that in such a case the side of the tube having the least resistance would bulge outwardly to a greater extent. However, by reason of the fact that the supply is separately controlled for each side of the capsule, it is obvious that regardless of a difference in the elastic conditions of opposite sides of the tube these sides must be outwardly projected to the same degree because they are filled with an equal quantity of liquid.

The filling material is passed through the mandrel 55 under pressure from suitable pressure devices 147 and 148. There are some medicines which are difficult to mix without stirring air into them, and if two pressure devices are used, one medicine can be pumped in one half of the capsule and another in the second half so that the mixing will take place within the capsule without the presence of air.

In the preliminary formation of the capsule the opposite sides of the gelatin tube are forced into the die cavities 76, as shown in Figure 5, and uniform halves of the capsule are formed. As the rotary capsule forming dies 57 and 58 continue to turn in a clockwise and anti-clockwise manner respectively, the gelatin tube is drawn further through the machine and the capsule halves are caused to slide over the swaged ends of the filling tube down to its narrowest point until the material in the forward edges of each die cavity is brought together as indicated at 73, Figure 4. At this point the material in the rearward edges of the same die cavities is still separated by the narrower end of the swaged sheath. Upon continuation of the rotary movement of the dies the meeting portions at 73 move through the nip of the dies so that the tube is pressed firmly and a shearing action takes place substantially simultaneously throughout the periphery of the die cavities immediately following the removal of the material adjacent the rearward edges of the die cavity from the extreme forward end of the swaged mandrel. In effect the action of the meeting die cavities is to shear and turn in the edges of the tube so sheared so that they will meet and seal together to form a perfect capsule. Surplus material 74 formed from part of the tube which extends between the die cavities is received in auxiliary cavities 75 between the die cavities and may be readily discharged for further use as referred to hereafter.

It will be noted that the mandrel, at its forward end just before the point where it is swaged is enlarged, as indicated at 77, to the normal cross sectional area that prevails when it passes between the forming rolls 46 and 47 so that it again engages the inner walls of the gelatin tube. Moreover, in the area 77 the mandrel is provided with a projecting peripheral bead 78 which functions to stretch the walls of the gelatin tube at this point so that the tube passes over this bead in wiping pressure contact. Consequently any air that may have found its way between the mandrel and the tube is prevented from passing on to the swaged end of the mandrel and is therefore prevented from entering into the capsules as they are formed. Thus, a uniform symmetrical capsule is produced from which air is excluded.

Figure 3:
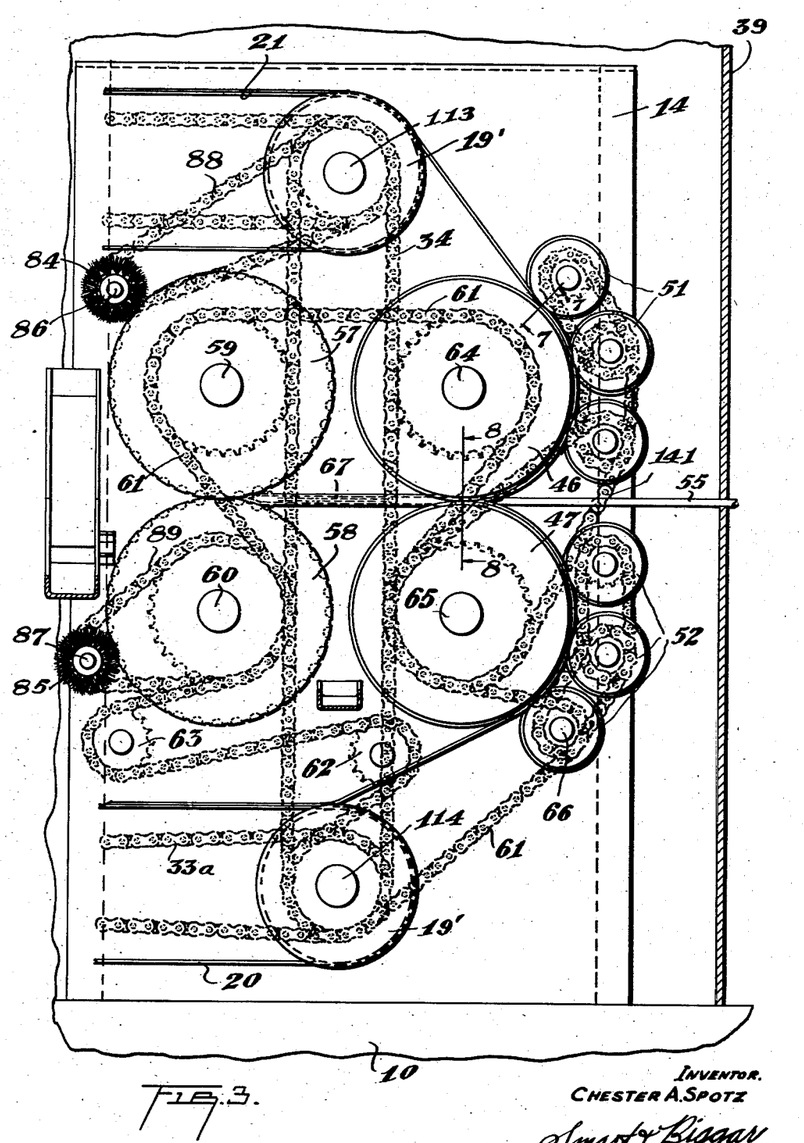
Fig. 3 is an enlarged elevation of the right hand end of Fig. 1 to illustrate in more detail the position and arrangement of the tube forming rolls and rotary capsule dies and the means of operating them and feeding the material thereto.

Associated also with the rotary dies 57 and 58 are rotary cleaning brushes 84 and 85 (see Fig. 3). These are disposed to engage the periphery of the dies at a point in their circumference beyond that where the capsules are formed so that that surface of each die which has just previously formed capsules is subjected to the cleaning action of the brushes. Hence the working surface of each die will be cleaned of any particles when it moves into contact with the tube to form the capsules. The rotary brushes are carried on shafts 86 and 87 carrying sprocket wheels which are in turn operated by the chains 88 and 89, the former being operated from a sprocket on shaft 113 while the latter from a sprocket carried on the shaft 60. Any other suitable cleaning means could be used.

Portions of the strips are subjected to a vacuum during the time they are being formed into the tube preparatory to forming the capsule. This is illustrated in Figs. 7 and 8 wherein the tube forming rolls 46 and 47 are shown as being provided with radially extending passageways 90 and 91, on each side of the channel 48, these passageways opening on the peripheral surface of the rolls at a point over which the marginal edges of the strips pass. The passageways 90 and 91 are connected by transverse passageways 93 which open on one side of each roll and communicate with the segmental vacuum heads 94 and 95. These segmental heads are arranged in such a way and are of such a length that vacuum will be applied to the marginal edges of the strips from the point where they move away from the end rolls of the series 51 and 52 respectively until the strips enter the nip of the forming rolls 46 and 47. Moreover, the lower segmental vacuum head is longer than the upper one as will be clearly seen from Fig. 9, so that after the tube has been formed, the marginal edges of the strips which have been sheared from the material designed to form the tube are still subjected to vacuum to carry them cleanly away from the tube as it is formed. These marginal edges of the strips will then be free to be discharged from the machine upon passing away from the area of the forming roll subjected to vacuum, to be reused again. The vacuum heads 94 and 95 are connected by means of suitable outlets 96 and 97 with a vacuum applying means of any well known construction.

The die rolls 57 and 58 also are provided with vacuum means as will be seen in Fig. 4. Radial passageways 79 are provided in each die roll leading from the surplus material cavities 75. Radial passageways 142 leading from the centre of each die cavity are also provided. The passageways 79 connect in the same manner as the passageways in the tube forming rolls with a suitable vacuum means through vacuum heads 143. Also in the vacuum heads are passageways connected to a source of air pressure 144. These passageways also communicate with the passageways 142 leading from the centre of each die cavity. The vacuum means operates to hold the surplus material on the die rolls after it has been sheared so that it is carried around the rolls far enough to be taken off and collected for use again, as it will not have been contaminated. When the die rolls have revolved to a point where the capsules can be cleared from the dies, air pressure is applied to the passageways 142 and the air blast removes the capsules from the dies.

Figure 6:
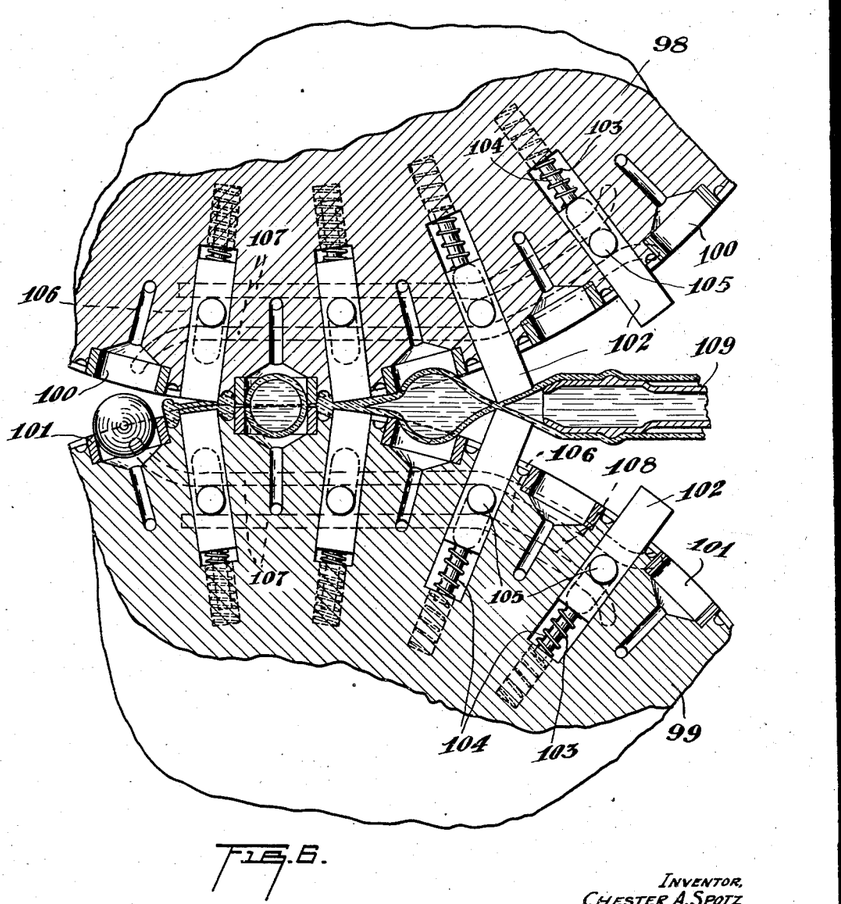
Fig. 6 is an enlarged fragmentary detail of an alternative construction for the rotary capsule forming die rolls and an alternative manner of forming capsules.

An alternative manner of making the capsules is shown in Fig. 6. In this case the rotary capsule forming die rolls 98 and 99 replace the die rolls 57 and 58 and carry, as in the case of said latter die rolls, suitable die cavities 100 and 101 respectively. These cavities, however, are spaced apart from one another around the periphery of the dies to a slightly greater extent than the die cavities in the dies 57 and 58 to permit the mounting therebetween of slidable plungers 102 normally spring-pressed outwardly by coil springs 103 which may encircle shanks 104 projecting from the plungers 102. The plungers also have laterally projecting pintles 105 which pass through slots in an outer wall of each of the rotary dies 98 and 99 and are designed to pass into a suitable cam track 106 formed by spaced apart guide rails 107, the cam track formed thereby being disposed as indicated at 108, substantially in the same arc as the arc of each die at a point where the pintles of the plungers first pass into the cam track. Thus, in the first instance, the plungers project to their fullest extent from the peripheral surface of the dies so that opposed plungers of each die may cooperate with one another and act to engage the tube at a point just beyond the mandrel 109 and to close one end thereof after it has received its supply of capsule forming material injected through the mandrel. This therefore, causes the walls of the capsule to bulge or to be forced outwardly just as this portion of the tube is about to be engaged by opposed cooperating die cavities of the rotary dies 98 and 99 which, in coming together, surround and confine between them that portion of the tube so filled. This is clearly illustrated in Fig. 6.

At the point where the plungers 102 engage the tube so as to close one end of it, the cam track 106 associated with each die 98 and 99 is offset so that it gradually causes the plungers 102 to retract against the action of their coil springs 103, the track being so designed that the plungers will remain in contact with that part of the tube disposed on each side of the die cavities forming the capsules. In this way capsules are readily formed from the tube and a substantially uniform capsule results. It is clear, of course, in this instance, that all other parts of the apparatus are substantially the same as those previously described except that the mandrel 109 is not swaged to the extent illustrated and described in connection with the preferred form of structure and it is not partitioned so as to provide for delivery of two equal quantities of capsule filling material to opposite sides of the tube. A measured quantity of the medicinal material is pumped into the tube just prior to its being sheared so that there is no leakage.

It will be apparent from the foregoing that capsules may be formed by the method outlined in a relatively simple manner and that the resulting capsule where desired can be formed so that it will be truly symmetrical and uniform, each capsule containing an identical quantity of filling material from which the air is positively excluded.

In the foregoing specification reference has been made to producing gelatin strips and forming the capsule from a gelatinous material. It is to be understood, however, that the invention is designed to apply to the formation of capsules from any material that is practicable and desirable.

What I claim as my invention is:

1. Apparatus for forming filled capsules comprising a pipe formed with a swaged wedge-like end having outlet ducts on opposite sides and partitioned longitudinally to form separated sections, means for feeding capsule covering material to the pipe, means for extending said material around the pipe to form a tube surrounding the latter, means for separately delivering capsule filling material through separate sections of the pipe to the outlet ducts, to expand opposite sides of the tube to a uniform extent and means cooperating with the pipe for engaging, shearing and sealing the ends of the tube on each side of the expanded portion to form a capsule.

2. Apparatus as claimed in claim 1 in which the means for engaging, shearing and sealing the ends of the tube comprises a pair of co-operating rotary dies formed with a plurality of opposed die cavities, said die cavities encircling each expanded portion of the tube and shearing and sealing the ends of the tube when they are caused to move substantially into engagement with one another.

3. Apparatus as claimed in claim 1 in which the means for extending said material around the pipe comprises a pair of co-operating forming rolls having a peripheral channel designed to extend around the pipe and having marginal edges designed to engage said covering material and to shear it and seal the marginal edges thereof to form the tube.

4. Apparatus for forming filled capsules comprising means for forming two strips of capsule covering material, means for moving said strips, a pair of forming rolls, means in connection with the forming rolls for forming said strips with a continuous channel, a pipe, means in connection with the forming rolls for pressing said channeled strips around the pipe and for shearing and sealing said strips to form a tube, said pipe having a discharge outlet over which said tube extends, means for delivering a measured quantity of capsule filling material through the pipe to the outlet to expand the tube and means cooperating with the pipe for engaging, shearing and sealing the ends of the tube on each side of the expanded portion to form a capsule.

5. Apparatus as claimed in claim 4 in which a casing is provided enclosing the strips of material, the tube and capsules, said casing being partitioned to form a plurality of chambers to form a means of controlling the temperature of the strip, tubes and capsules as they are formed.

6. Apparatus for forming filled capsules comprising means for forming two strips of capsule covering material, means for moving said strips, a pair of forming rolls, means in connection with the forming rolls for forming said strips with a continuous channel, a pipe, means in connection with the forming rolls for pressing said channeled strips around the pipe and for shearing and sealing said strips to form a tube, said forming rolls having means on their peripheral surfaces to cause the sheared surplus material to be carried a predetermined distance beyond the point of shear, said pipe having a discharge outlet over which said tube extends, means for delivering a measured quantity of capsule filling material through the pipe to the outlet to expand the tube and means co-operating with the pipe for engaging, shearing and sealing the ends of the tube on each side of the expanded portion to form a capsule.

7. Apparatus as claimed in claim 6 wherein temperature control means for the strips of capsule covering material are provided.

8. Apparatus as claimed in claim 6 wherein lubricating means for the strips of capsule covering material are provided.

9. Apparatus as claimed in claim 6 wherein means are provided to stop intermittently the movement of a part of the strips of capsule covering material to take up the stretch therein.

10. Apparatus as claimed in claim 6 having automatic means for stopping intermittently the movement of a part of the strips of capsule covering material to take up the stretch therein.

11. Apparatus for forming filled capsules comprising a storage tank for the capsule covering material, a series of endless belts for carrying the said material, means for depositing the said material on the said belts in a predetermined thickness, lubricating means for the said material to prevent it adhering to the said belts, temperature control means associated with the said belts, means for stopping intermittently the movement of a portion of each strip of material deposited on the belt to take up the stretch therein, means for forming pairs of strips into a tube, a partitioned pipe having inlet and outlet openings therein and over which the said tube is drawn, die rolls associated with the said pipe for forming capsules, means for drawing the tube along the pipe and pressure means associated with the said pipe for delivering intermittently predetermined quantities of filling material to the pipe to expand the tube and means on the die rolls co-operating with the pipe for engaging, shearing and sealing the ends of the tube on each side of the portion thereof expanded by the filling material to form a capsule.

12. The method of making capsules which comprises forming a tube of capsule covering material around a pipe, flattening two opposed sides of the tube, exerting pressure around only the perimeter of an area of each flattened side, delivering capsule filling material to the tube within each said area while said pressure is so exerted, thus to expand the walls of the tube within said areas, bringing the sides of the tube together while the walls are so expanded, and exerting further pressure around the perimeter of said areas to shear the tube and seal the walls thereof together around said areas to form a sealed capsule.

13. In an apparatus for forming capsules, means for wrapping capsule covering material in strip form around a pipe and for sealing adjacent edges of said material together to form a tube thereof on said pipe, said means comprising a pair of revolving members, means to cause the peripheral surfaces of said members to move in close proximity to each other and to said pipe during part of their travel, means for applying capsule covering material in strip form to the said peripheral surfaces, passageways extending from said peripheral surfaces, and means for connecting said passageways to a source of vacuum during at least that part of the travel of said members preceding the point at which said peripheral surfaces are in closest proximity.

14. In an apparatus for making capsules, a hollow member partitioned to form separated sections and provided with an outlet for each section, means for pressing separate portions of capsule covering material against said member around each of said outlets, whereby communication between said separate portions is prevented, and means for supplying capsule filling material separately to each of the sections of said member and delivering it to said portions through said outlets.

15. Apparatus for forming capsules comprising a pipe having an outlet at one end thereof, a pair of cooperating rotary members for wrapping capsule covering material in strip form around said pipe and for sealing adjacent edges of said material together to form a tube of said material on said pipe, a second pair of cooperating rotary members for drawing said tube along said pipe toward the end of the latter over said outlet, a circumferential bead formed on the pipe and spaced from the outlet for preventing seepage of air between the pipe and the tube, means for delivering capsule filling material through said outlet to the tube, and means on said last mentioned rotary members for shearing and sealing the filled tube at predetermined intervals, after it has been drawn off the end of the pipe, to form sealed capsules.

16. Apparatus for forming capsules comprising a pipe longitudinally partitioned to form separated sections, a pair of cooperating rotary members for wrapping capsule covering material in strip form around said pipe and for sealing adjacent edges of said material together to form a tube of said material on said pipe, a second pair of cooperating rotary members for drawing said tube along said pipe toward the end of the latter, said end being of wedge like form and projecting between the second pair of rotary members, an outlet communicating with one of the sections of the pipe being formed in each of the opposed faces of the wedge, means for delivering capsule filling material through said outlets to the tube, and means on said last mentioned rotary members for shearing and sealing the filled tube at predetermined intervals, after it has been drawn off the end of the pipe, to form sealed capsules.

17. Apparatus for forming capsules comprising a pipe of reduced cross section intermediate its length and having an outlet at one end thereof, a pair of cooperating rotary members for wrapping capsule covering material in strip form around said pipe and for sealing adjacent edges of said material together to form a tube of said material on said pipe, a second pair of cooperating rotary members for drawing said tube along said pipe toward the end of the latter over said outlet, means for delivering capsule filling material through said outlet to the tube, and means on said last mentioned rotary members for shearing and sealing the filled tube at predetermined intervals, after it has been drawn off the end of the pipe, to form sealed capsules.

18. Apparatus for forming capsules comprising a pipe having an outlet at one end thereof, a pair of cooperating rotary members for wrapping capsule covering material in strip form around said pipe and for sealing adjacent edges of said material together to form a tube of said material on said pipe, a pair of cooperating rotary dies for drawing said tube along said pipe towards the end of the latter over said outlet, means for delivering capsule filling material through said outlet to the tube, a plurality of opposed die cavities formed in said dies, pairs of said die cavities encircling parts of the filled tube at predetermined intervals and shearing and sealing the tube around the encircled parts thereof when they are caused to move substantially into engagement with one another, and a plurality of movable plungers mounted in the dies between the die cavities to engage the tube on either side of the die cavities to assist in forming the capsules.

19. Apparatus for forming capsules comprising a pipe, a pair of cooperating rotary members for wrapping capsule covering material in strip form around said pipe and for sealing adjacent edges of said material together to form a tube of said material on said pipe, a pair of die rolls arranged to rotate in contact with one another for drawing said tube along said pipe towards one end of the latter, a plurality of die cavities formed in the peripheries of the die rolls and adapted to register with one another at the nip of the rolls, said one end of the pipe over which the tube is drawn being in the form of a wedge with faces of a curvature substantially the same as that of the rolls, said end being disposed with its apex susbtantially at the nip of the rolls and its faces spaced from the periphery of the rolls near the nip by a distance somewhat less than the normal thickness of the capsule covering material, whereby the latter is compressed by the edges of the die cavities as the tube passes over said faces, an outlet for capsule filling material being formed in each of said faces, and means for delivering capsule filling material through each outlet to the tube whereby the capsule covering material is expanded into said die cavities as the latter pass over the outlets, the edges of the die cavities acting to shear and seal the expanded portions of the tube as they pass through the nip of the rolls and after they have been drawn off the end of the pipe, to form sealed capsules.

20. Apparatus for forming capsules comprising a pipe longitudinally partitioned to form separated sections and having an outlet from each section, means for wrapping capsule covering material in strip form closely around said pipe, means for sealing adjacent edges of said material together to form a tube of said material on said pipe, means for intermittently delivering capsule filling material from separate sources of supply through each of said outlets to predetermined sections of said tube to expand its walls in said sections, and means for pressing and shearing the tube at opposite ends of said sections to seal said filling material therewithin and form sealed capsules.

21. The method of making capsules which comprises extending capsule covering material around a pipe to form a tube, stretching and flattening a section of the tube to provide opposed substantially flat sides, passing flowable capsule filling material through the pipe in two independent streams, delivering substantially equal quantities of said filling material separately and independently to each flattened side of the tube to expand said sides to a substantially equal extent, and pressing and shearing the tube at opposite ends of said section to seal said filling material therewithin to form a sealed capsule.

22. Apparatus for forming capsules comprising a pipe having an outlet at one end thereof, means for wrapping capsule covering material in strip form around said pipe and for sealing adjacent edges of said material together to form a tube of said material around said pipe, means for drawing said tube along said pipe and over said outlet, said pipe having an enlarged portion, between said wrapping means and said outlet, the maximum perimeter of said portion being greater than the normal internal perimeter of said tube, whereby said tube is stretched as it passes to the outlet and seepage of air between the tube and the pipe is prevented, means for delivering capsule filling material through said pipe and outlet to the tube, and means for pressing and shearing the tube at predetermined points to seal capsule filling material in said tube and form sealed capsules.

23. Apparatus according to claim 22, in which the pipe is longitudinally partitioned to form separated sections each having an outlet at the end of the pipe.

CHESTER A. SPOTZ.